United States Patent Office 2,984,655
Patented May 16, 1961

2,984,655
CURING OF POLY(VINYL METHYL ETHER)

David C. Kirk, Jr., Brevard, N.C., assignor to Hercules Powder Company, Wilmington, Del., a corporation of Delaware No Drawing. Filed July 6, 1960, Ser. No. 41,019

8 Claims. (Cl. 260—91.1)

This invention relates to the curing of poly(vinyl methyl ethers).

It is known that poly(vinyl methyl ethers) can be cured by a combination of sulfur and certain organic peroxides as catalyst therefor. Such polymers have the disadvantage that they contain sulfur in both combined and free states.

In accordance with the present invention, it has now been found that poly(vinyl methyl ether) is much more completely cured by heating a composition of poly(vinyl methyl ether) and dicumyl peroxide or its homologs and that sulfur is not necessary for effective cross-linking with this peroxide.

The dicumyl peroxide is used in an amount in the range of 0.1 to 20% of the weight of the polymer (preferably 0.5 to 10%) and incorporated in the polymer by use of the usual compounding procedures used in the rubber industry. The compounding is carried out under temperature controlled conditions so as to avoid premature cure. A temperature in the range of 50° F. to 250° F. may be safely used.

The improvement in curing is applicable to both crystalline and amorphous poly(vinyl methyl ether). The improvement is determined by change in solubility and by percent swell of the insoluble material. While uncured amorphous poly(vinyl methyl ether) is soluble in toluene, used for the determination of gel and percent swell, the crystalline poly(vinyl methyl ether) is already largely insoluble, and the increase in amount of gel and decrease in percent swell are both indicative of cure.

The preferred temperature at which curing is effected lies in the range of about 250° F. to about 380° F., but temperatures as high as 700° F. may be used with short cure times so as to avoid decomposition.

The degree of cure is improved by the addition of quinone dioxime dibenzoate or triallyl cyanurate to the composition in an amount in the range of 0.5–20% of the polymer. The composition may also contain fillers such as carbon black, silica, calcium carbonate, zinc oxide, and other inorganic fillers.

Examples of compositions cured in accordance with this invention with gelation tests to show degree of cure are set forth in Tables 1 and 2.

The compositions of Tables 1 and 2 were prepared by dry milling the poly(vinyl methyl ether) with dicumyl peroxide and other components on a two-roll mill at about 100° F. in the case of the amorphous polymer and at about 250° F. in the case of the crystalline polymer. The compositions were then cured in a closed mold under 500 p.s.i. Amounts of ingredients are expressed as parts by weight, and percentages are by weight.

The percent gel and percent swell were determined as follows: a weighed cylindrical sample of polymer weighing about 100 mg. was soaked at room temperature in an excess of toluene (30 cc.) in a closed container for 48 hours. The sample was then removed, blotted on filter paper without squeezing so as to remove toluene on the surface and weighed at once. The swollen sample was then dried in a current of air at room temperature over a 72-hour period to constant weight. The weights were corrected for non-polymer content based on knowledge of components. From these figures:

$$\frac{\text{Corrected dry weight}}{\text{Corrected initial weight}} \times 100 = \text{percent gel}$$

Similarly, percent swell was calculated by the formula:

$$\frac{\text{Corrected swollen weight} - \text{corrected dry weight}}{\text{Corrected dry weight}} \times 100 = \text{percent swell}$$

No correction was applied for insolubility of the uncured crystalline polymer in toluene.

Methods for the preparation of amorphous and crystalline poly(vinyl methyl ether) are known in the art, viz., U.S. Patent No. 2,799,669 and British Patent No. 820,469. Both cold water soluble and cold water insoluble polymers are cured by the process of this invention.

Table 1

| Poly(vinyl methyl ether)— A* | 100 | 100 | 100 | 100 | 100 | 100 | 100 | 100 | 100 | 100 | 100 | | | | | | | | | |
|---|---|---|---|---|---|---|---|---|---|---|---|---|---|---|---|---|---|---|---|---|
| Poly(vinyl methyl ether)— C* | | | | | | | | | | | | 100 | 100 | 100 | 100 | 100 | 100 | 100 | 100 | 100 |
| Dicumyl peroxide | | 5 | 5 | 1 | 2 | 4 | 8 | 1 | 2 | 4 | 8 | | 1 | 2 | 4 | 8 | 1 | 2 | 4 | 8 |
| Quinone dioxime dibenzoate | | | 5 | | | | | 1 | 2 | 4 | 8 | | | | | | 1 | 2 | 4 | 8 |
| Cure temperature, °F | | 320 | 320 | 320 | 320 | 320 | 320 | 320 | 320 | 320 | 320 | 320 | 320 | 320 | 320 | 320 | 320 | 320 | 320 | 320 |
| Cure time (Minutes) | | 30 | 30 | 30 | 30 | 30 | 30 | 30 | 30 | 30 | 30 | 30 | 30 | 30 | 30 | 30 | 30 | 30 | 30 | 30 |
| Percent Gel | 0 | 84 | 95 | 96 | 92 | 95 | 98 | 92 | 30 | 93 | 98 | 52 | 97 | 83 | 73 | 93 | 98 | 100 | 95 | 95 |
| Percent Swell | | 950 | 410 | 1,150 | 840 | 640 | 520 | 810 | 510 | 420 | 350 | 1,470 | 940 | 1,230 | 1,130 | 620 | 410 | 390 | 490 | 335 |

A* = amorphous, RSV 2.3.
C* = crystalline, RSV 8.0, cold water insoluble polymer of British Patent No. 820,469.

Table 2

| Poly(vinyl methyl ether)— A* | 100 | 100 | 100 | 100 | 100 | 100 | 100 |
|---|---|---|---|---|---|---|---|
| Dicumyl peroxide | 0 | 2 | 4 | 2 | 4 | 2 | 4 |
| Quinone dioxime dibenzoate | | | | 2 | 4 | | |
| Triallyl cyanurate | | | | | | 2 | 4 |
| High abrasion furnace black | 50 | 50 | 50 | 50 | 50 | 50 | 50 |
| Curve temperature, °F | 320 | 320 | 320 | 320 | 320 | 320 | 320 |
| Cure time (Minutes) | 30 | 30 | 30 | 30 | 30 | 30 | 30 |
| Percent Gel | 0 | 87 | 97 | 99 | 100 | 95 | 103 |
| Percent Swell | | 755 | 365 | 350 | 260 | 440 | 175 |
| Tensile strength, p.s.i | | 850 | 1,850 | 1,705 | 1,450 | 1,750 | 1,400 |
| 100% Modulus, p.s.i | | 220 | 320 | 350 | 680 | 240 | |
| Max. Elongation, percent | | 460 | 315 | 265 | 160 | 410 | 110 |

A* = amorphous, RSV 2.3.

The cured compositions of this invention are improved in physical properties and reduced solubility in organic solvents and are improved for many coating applications including wire coating, and for molded articles where these properties are desired. When bis($\alpha,\alpha$-dimethyl-p-methylbenzyl) peroxide and bis($\alpha,\alpha$-dimethyl-p-isopropylbenzyl) peroxide were substituted for dicumyl peroxide in the above examples, improvements of similar magnitude were obtained.

The homologs of dicumyl peroxide which are included in the scope of the present invention are all peroxides of the formula

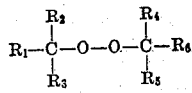

in which $R_1$ and $R_6$ are phenyl, and lower alkyl substituted phenyl and $R_2$, $R_3$, $R_4$, and $R_5$ are hydrogen or lower alkyl, said lower alkyl containing 1 to 4 carbon atoms. The preferred peroxides are those in which $R_2$, $R_3$, $R_4$, and $R_5$ are lower alkyl, and the preferred example of this group is dicumyl peroxide. Specific preferred peroxides of this invention besides dicumyl peroxide are bis($\alpha,\alpha$-dimethyl-p-methylbenzyl) peroxide, and bis($\alpha,\alpha$-dimethyl-p-isopropylbenzyl) peroxide, which are higher homologs of dicumyl peroxide.

What I claim and desire to protect by Letters Patent is:

1. The method of curing poly(vinyl methyl ether) which comprises heating poly(vinyl methyl ether) in contact with 0.1 to 20% of a peroxide of the formula

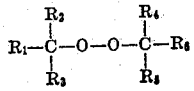

in which $R_1$ and $R_6$ are selected from the group consisting of phenyl and lower alkyl substituted phenyl and $R_2$, $R_3$, $R_4$, and $R_5$ are selected from the group consisting of hydrogen and lower alkyl radicals, said lower alkyl containing 1 to 4 carbon atoms at a curing temperature in the range of 250° F. to 700° F.

2. The method of curing poly(vinyl methyl ether) which comprises heating poly(vinyl methyl ether) in contact with 0.1 to 20% dicumyl peroxide at a curing temperature in the range of 250° F. to 700° F.

3. The method of claim 2 in which the dicumyl peroxide is used in an amount in the range of 0.1 to 10% and the curing temperature is in the range of 250° F. to 380° F.

4. The method of claim 3 in which the poly(vinyl methyl ether) is amorphous.

5. The method of claim 3 in which the poly(vinyl methyl ether) is crystalline.

6. The method of claim 3 in which 0.5 to 20% quinone dioxime dibenzoate is included in the composition during the curing treatment.

7. The method of curing poly(vinyl methyl ether) which comprises compounding poly(vinyl methyl ether) with 0.1 to 10% dicumyl peroxide at a temperature below cure temperature and subsequently heating the composition at a temperature in the range of 250° F. to 380° F. to effect a cure.

8. The method of claim 3 in which 0.5 to 20% triallylcyanurate is included in the composition during the curing treatment.

References Cited in the file of this patent
UNITED STATES PATENTS
2,429,587    Schildknecht _____ Oct. 21, 1947